Patented Feb. 25, 1930

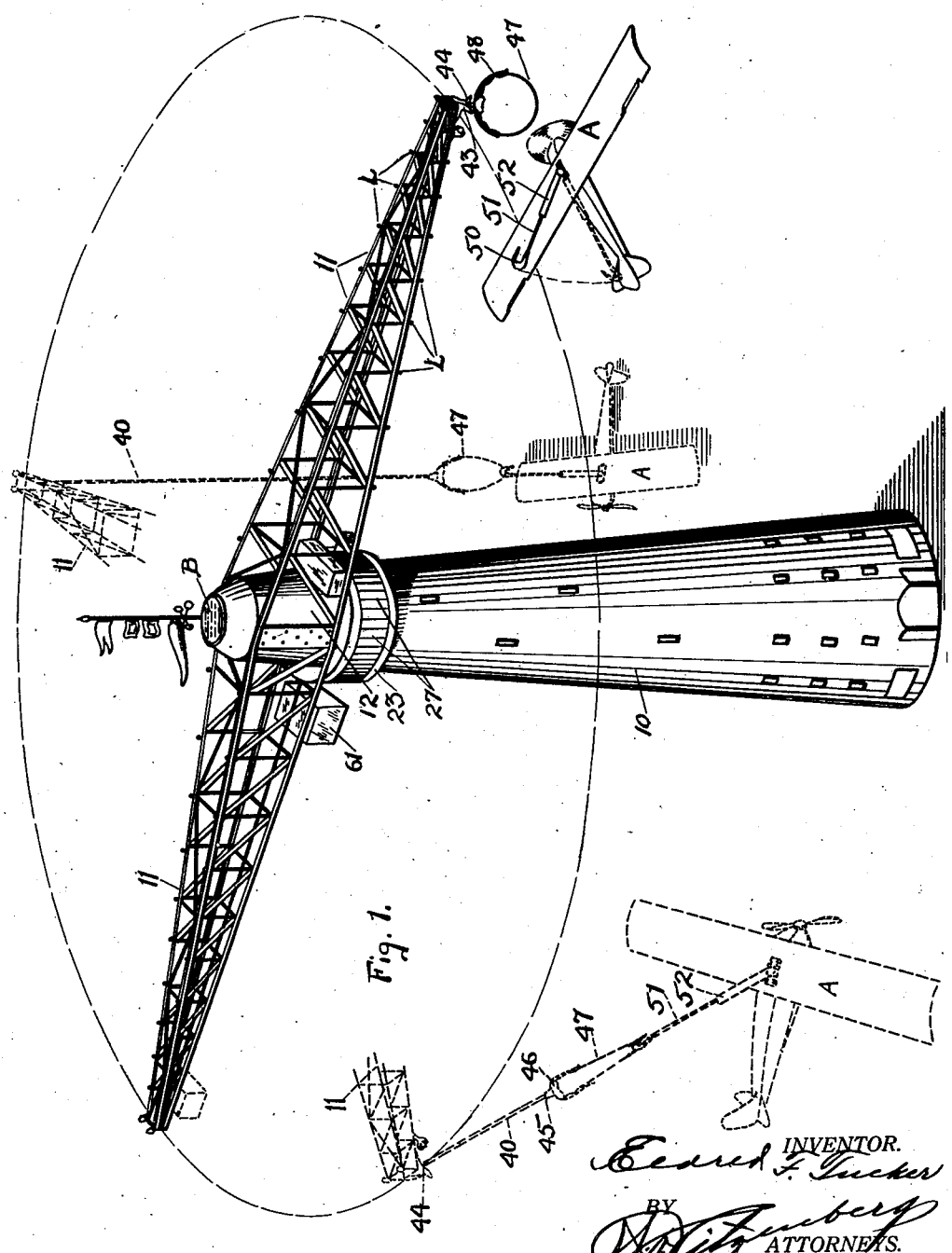

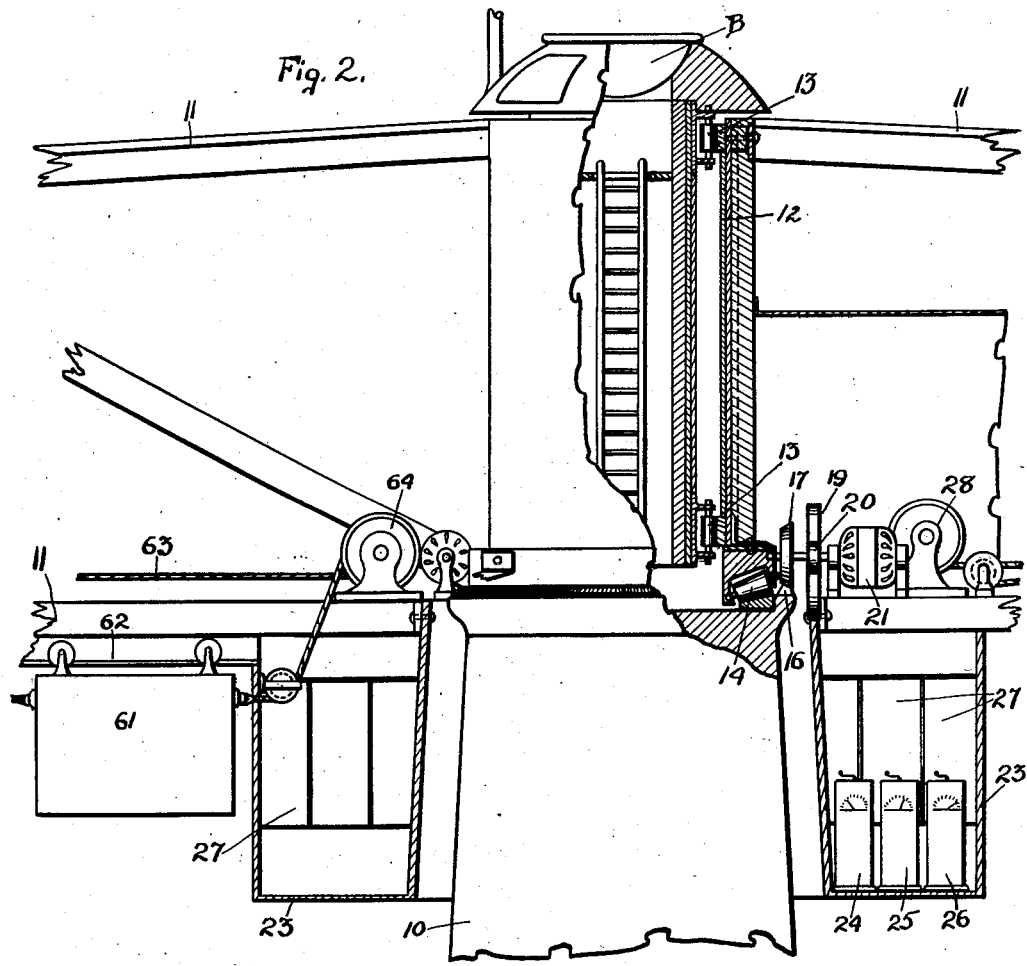
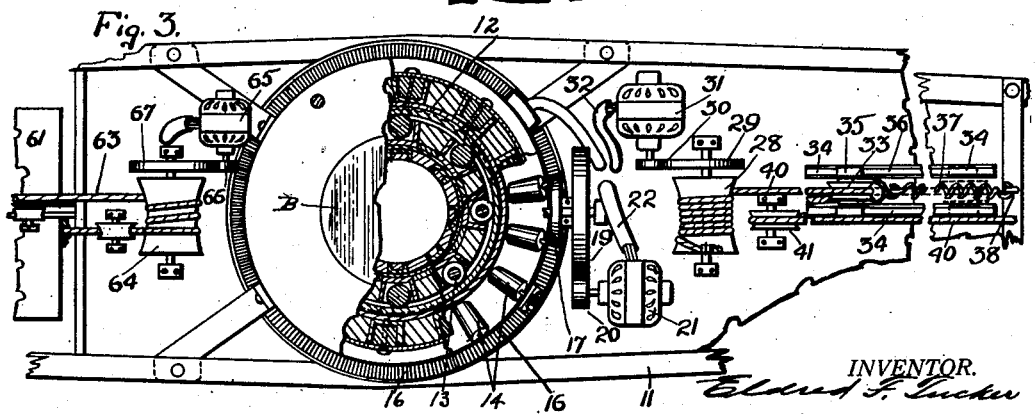

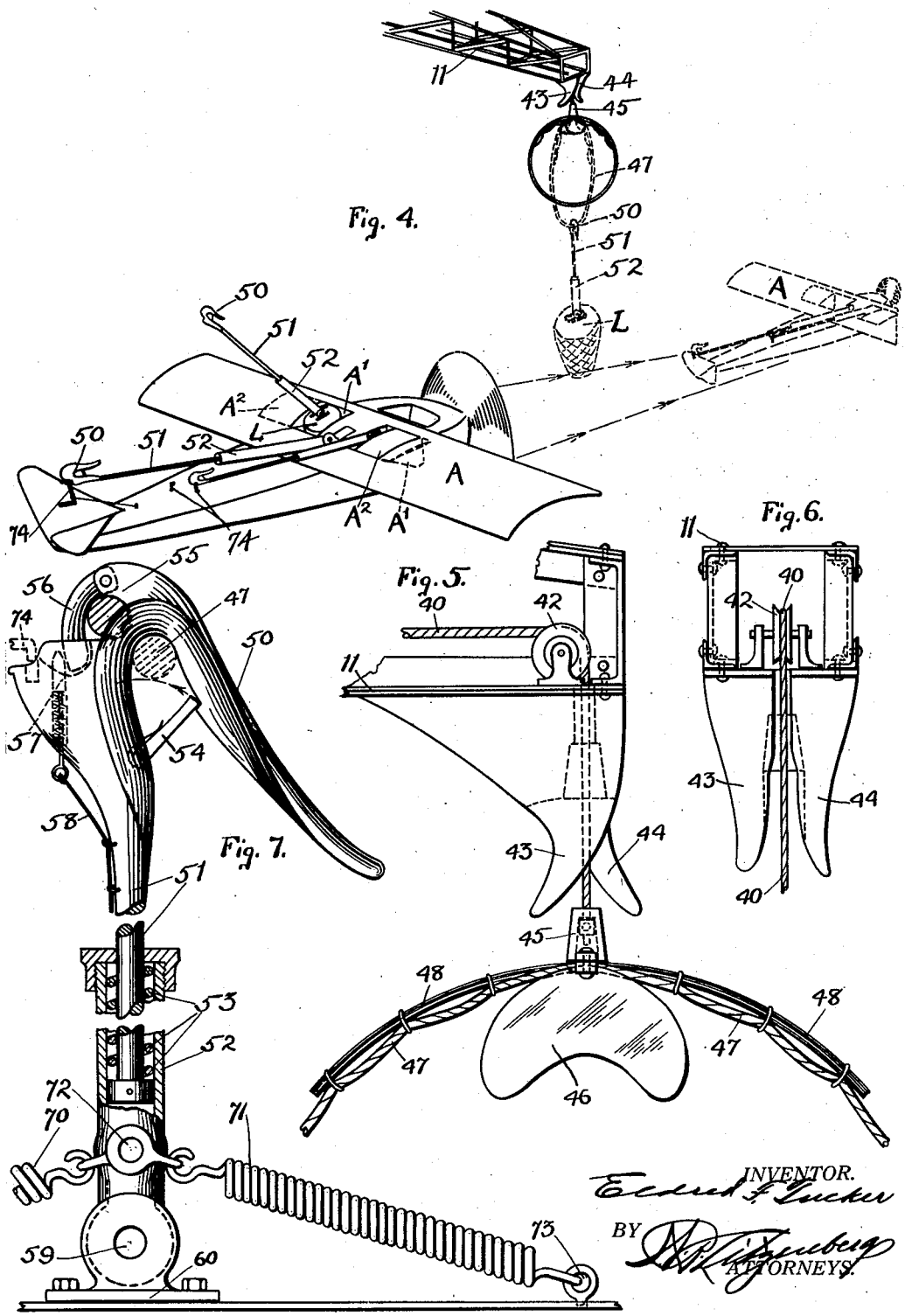

1,748,663

UNITED STATES PATENT OFFICE

ELDRED F. TUCKER, OF LOS ANGELES, CALIFORNIA, ASSIGNOR TO CHARLES B. SCOVILLE, JR., AND HIMSELF

METHOD AND MEANS FOR LANDING AND LAUNCHING AIRCRAFT AND AIRCRAFT FREIGHT

Application filed September 20, 1927. Serial No. 220,718.

My invention provides a new method of landing aeroplanes by catching the aeroplane in flight and swinging it in a circular course around a superstructure until it comes to rest and then lowering it to the ground. My invention is also adaptable for receiving and landing freight and mail from moving aircraft and continuing the movement of said freight or mail as it is received from said aircraft in a circular course around a supporting structure until it comes to rest, with means for lowering it to the ground.

My invention also makes possible the launching of an aeroplane by suspending it and causing it to swing around a circular course until the required speed is attained, whereupon it is released and sails off into space under its own power.

So far as I am aware, I am the first to invent an apparatus designed and intended to catch an aeroplane, or other flying machine, while in flight and to change its course of movement into a circular swinging movement about a supporting superstructure for the purpose of bringing said aircraft to a standstill and landing it, or of using such an apparatus for launching aircraft, or for receiving mail or other freight from flying machines as they move near said superstructure.

By converting the straightaway movement of an aeroplane into a circular movement, with said aeroplane attached to a swinging part of a superstructure, it will be understood that much less area is required to make landings of aircraft, or of mail or freight therefrom, or to launch aircraft.

In order to illustrate my invention, I have shown on the accompanying three sheets of drawings, one embodiment thereof, which I will describe in detail.

Figure 1 is a perspective view of a complete superstructure embodying my invention, and designed for landing or launching aeroplanes, and for receiving mail;

Figure 2 is a fragmentary view of the top part of the superstructure, partly in vertical section, and showing some of the control mechanism;

Figure 3 is a plan view, partly in section, of those parts shown in Fig. 2;

Figure 4 shows the method of using the apparatus for landing mail or freight;

Figure 5 is a view of the end of the truss or arm, with the catching loop;

Figure 6 is an enlarged end view of mechanism for guiding the cable and loop; and Figure 7 is an enlarged detail of a hook for landing and launching purposes.

Referring now more in detail to the drawings, I will describe the apparatus shown for the purpose of illustrating how my new method can be embodied in practical means for landing and launching aircraft and for landing freight and mail.

In Figure 1 I have illustrated a tower or superstructure 10, which can be of any suitable construction and of the desired height and heft to carry the load strain to which it is to be subjected. This will be built according to standard engineering and architectural skill and designed to revolubly support the great arms of a cross structure, designated as a whole 11, and arranged to revolve about the top of said tower or superstructure, as represented in the drawings. The steel members of said arms 11, are shown secured to a cylindrical steel body 12, with vertical rollers 13, and inclined rollers 14, constituting an antifriction bearing between said arms 11, and the top of said tower or superstructure. Around said tower structure, at the lower side of said arms 11, is a ledge 15, around the top of which is mounted a rack 16, with which meshes a beveled gear 17, on a short shaft 18, also carrying a driving gear 19, which meshes with a pinion 20, on a motor 21, to which lead the electric lines 22. Thus from the motor 21, said arm structure can be revolved about the top of said tower or superstructure. Around said tower, below the arm structure and supported by and revolving with said arm structure, is a housing 23, in which the controls 24, 25 and 26 are shown, and in which the operator is stationed and from which he has clear vision of approaching aircraft and has full view of any landing or launching operation, as said housing is provided with windows 27 therearound.

Mounted in said arm structure 11, Figs. 2 and 3, is a cable drum 28, provided with a driving gear 29, in mesh with a pinion 30, on a motor 31, with its power lines 32, running from one of the controls 25, is said housing 23, as will be readily understood, inasmuch as this is standard equipment. The cable from said drum 28 runs over a traveling pulley 33, running on tracks 34, 34, and to this end said pulley is provided at its opposite sides with track wheels 35, 35. Connected to said pulley is a yoke 36, to which is attached a coiled spring 37, the outer end of which is anchored as at 38, to a cross member 39, in the arm structure 11. The cable is designated 40, and after passing around under the traveling pulley 33, passes to and around a fixedly anchored pulley 41, and thence to the outer end of said arm structure 11, and over a pulley 42, Figs. 5 and 6, and down through fixed guide cams or wings 43 and 44, mounted on the underside of the outer end of said arm structure. The end of said cable 40, is provided with a swivel 45, with a saddle member 46 thereunder, and with a catching and holding loop 47, of said cable, with a spring arch 48, secured to the upper part of said cable loop 47, for the purpose of keeping it open when there is no strain thereon. The saddle member 46 prevents the loop from being elongated too sharply when a load is thereupon. The swivel member 45, is designed to enter between the guide wings 43 and 44 in such manner as to always maintain the loop properly positioned to receive its catch, as hereinafter again referred to, and as seen in Fig. 1.

Referring now to Fig. 7, I have shown one form of hook for use on aircraft, or mail and freight handlers and by means of which said aircraft or freight can be attached to the loop 47. The hook proper is designated 50, and is formed at the upper end of a stem or body 51, extended into a cylindrical member 52, with a coiled spring 53, operating therein as illustrated, whereby to provide a yielding anchorage for said hook, as will be clear from the showing in Fig. 7. A spring actuated dog 54, is provided in the mouth of said hook 50, to prevent the accidental disconnection thereof from the loop 47, when said hook shall have caught said loop. The bend of said hook 50 is made of heavy saddle formation as shown to prevent too sharp bending of the loop when weight or strain is placed thereon. The upper part of said hook 50, is also provided with a loop socket at 55, with latch 56, and spring plunger dog 57 to hold the cable or loop 47 therein, as will be clear from said Fig. 7. A cord 58 is shown attached to said spring plunger dog 57, for releasing it, when it is desired to detach the cable or loop from the socket 55, as will be understood from the showing. The base or cylinder 52, of said hook mechanism, is pivotally attached as at 59, to a base or bracket 60, which is secured to the aircraft or load, as the case may be.

In the present showing, or embodiment of my invention, I have shown the aeroplanes, A, provided with hook mechanisms similar to that just described and adapted to be raised from the top portion of the plane, as illustrated, in position to catch the loop 47, at the outer end of the arm structure 11, as will be clear from Fig. 1.

In Fig. 4, I have illustrated how the planes can be provided in the top of their wings with freight or mail pockets, A', with slide covers A², the containers or carriers for said freight or mail being provided with the hook mechanism 50, as shown, whereby as the plane moves under the arm structure 11, of the superstructure, and said hooks are raised into catching position, as illustrated in Fig. 4, the load will be delivered to the loop 47, as the plane moves on, as shown in light broken lines in said Fig. 4, and in which the load is left hanging to the loop 47. The spring construction in the base of the hook mechanism provides for a yielding connection between the load and the hook proper. This provides a degree of cushion action in the delivery. The load, which may be mail, or other freight delivered, is designated L.

When a plane or other aircraft is landing and connects with the loop 47, at the outer end of the arm structure 11, there will be a tendency to overbalance the arm structure as the plane comes to rest and its weight is suspended therefrom. To offset this, I have provided a counterweight 61, running on a track 62, and adapted to be moved along the track 62, under the opposite end of the arm structure 11, by means of a cable 63, over a cable drum 64, driven by a motor 65, through gears 66 and 67. The electric wires, 68, from said motor run to the control, as 26, so that the operator can operate said counterweight as may be necessary.

Thus the operator in the tower house 23, can control the counterweight 61, and move it as required as a plane settles with its weight suspended from the arm structure 11, and can control the operation of the cable from which said plane or load is suspended after a landing or during a launching, and can also control the revolving movement of said arm structure 11 about a circular course of travel.

I prefer that the landing and launching hooks or arms which are pivotally connected to the aircraft, or to the containers for mail or other freight be yieldingly connected thereto and also that provision be made for automatically raising said hooks or catching arms to operative positions when released, as will be understood from Fig. 7, in which two coiled springs 70 and 71 are shown pivotally connected at 72, to said arm, and at their opposite ends anchored, as at 73. A latch 74 is provided for holding the arm down on top of the fuselage when not in use for landing purposes. These mechanisms are illustrative of means for handling the landing and launching arms, and will be readily understood from the showing made. One of the important features of my invention, however, is the provision of an arm or its equivalent on the aircraft or the load adapted to be positioned for the landing or launching in connection with the swinging or revolving arm structure, as hereinbefore described.

I have also provided at the top of the tower 10, provision for a beacon light, B, and have provided lamps along said arm structure to outline the same for the benefit of the aviators approaching the landing and launching apparatus. These lamps are designated L. These may be arranged so as to give the best differentiating results and to make for certainty in determining the positions of the mechanisms.

The lower part of the tower structure can be used for offices, waiting rooms, or such other purposes as may be required or convenient, as will be understood from the structure showing in Fig. 1.

The use and operation of my invention will be readily understood from the foregoing description and the drawings illustrating apparatus embodying the same, but may be briefly restated as follows:

Referring first to Fig. 1, at the right hand side of the drawing, it will be seen that an aeroplane A, is approaching the grappling mechanism, that is the loop 47, with its hook or catching arm 50, 51, 52, raised into position to catch said loop. As soon as said aeroplane is thus caught, or attached to the outer end of said arm, said arm is revolved in a circular course, as indicated by the circle broken line. It is to be understood that the plane can maintain its own power and a reduced speed and can change its course with its rudder so that it will move around the circle somewhat in the manner indicated in the light broken line position at the left side of said Fig. 1, with the cable somewhat extended. At the opposite side of said Fig. 1, that is, at the top thereof, the position of the arm is indicated in fragmentary, broken lines, which is the position in which the plane has come to a standstill and has been lowered to the ground.

In launching an aeroplane, the cable would be attached thereto by means of the arm 51, the loop 47, or other cable means, attached in the cable socket 55, Fig. 7, whereupon the arm structure 11 would be revolved sufficiently to start the plane which would assist with its own power until said plane was being carried around the circular course and swinging outwardly until such time as its own power and movement indicated that the latch 57 would be released, whereupon said aeroplane would sail off into space under its own power.

Thus it will be understood that the landing and the launching can be accomplished with the same apparatus and along the lines suggested. In landing freight or mail, the containers for the same, will be provided with supporting mechanism, such as an arm, or other equivalent means, adapted to be attached and detached, whereby as the plane moves near the grappling mechanism of the arm structure 11, said freight or mail will be lifted from the plane, somewhat in the manner indicated in Fig. 4, and in which I have shown the pockets or chambers A' having their rearward walls inclined to facilitate the movement of the load therefrom as its hook or supporting mechanism connects with the grappling mechanism of the arm structure.

I am aware that many changes in the construction and arrangement can be made and probably will be made as some of the engineering and mechanical problems are worked out in detail, and that these can be made without departing from the spirit and heart of my invention, and I do not, therefore, limit my invention to the showing made for illustrative purposes, except as I may be limited by a broad construction of the claims herewith.

I claim:

1. Means for landing and launching aeroplanes and for receiving freight and mail therefrom while said aeroplanes are in flight, said means including in combination a supporting structure, a horizontally swinging arm revolubly mounted at an elevation on said structure, a cable in said arm, guide means at the outer end of said arm for said cable, a holding loop at the outer end of said cable and under the outer end of said arm for catching and holding the load, means for yieldingly holding said cable for letting it out relative to the end of said arm with the load thereon, and a hook device to be attached to aeroplanes and to loads, said hook device being adapted for attachment to said loop.

2. An aeroplane provided with means for landing and launching the same, said means comprising an upwardly projecting arm, pivotally connected therewith at its lower end and provided with a hook at its upper end, and by means of which said aeroplane can be suspended, said arm being yieldingly extensible and adapted to be automatically caught by a suspended grappling device and being yieldingly attached to said aeroplane, said arm being also adapted to be laid along the top of said aeroplane when not in use.

3. In aerial navigation, landing and launching apparatus including a tower structure, an arm structure revolubly mounted at the top of said tower structure, grappling mechanism at the outer end of said arm at one side of said tower structure for holding the load, a counter weight at the outer side of said tower structure and movable along said arm, power means with connections for moving said counterweight, power means with connections for revolving said arm structure at will, power means with connections to said grappling mechanism for raising and lowering the same with its load, supporting mechanism for attachment to the load and having means for attachment to said grappling mechanism, and releasable means for controlling the attachment with the grappling mechanism.

4. In apparatus of the character referred to, in combination, an elevated arm supported to swing about a vertical axis, a cable along said arm and provided at its outer end and at the outer end of said arm with a loop, at its attached end means for yieldingly anchoring said cable and for letting it out and drawing it in, means holding said loop in a plane longitudinally of said arm, said loop being yielding and provided with means for normally holding it expanded horizontally, and a hook yieldingly extensible longitudinally for attachment to the load to catch in said loop, whereby a load can be transferred to said loop.

5. In an apparatus of the character referred to, in combination, an elevated arm supported to swing about a vertical axis, a cable along said arm and attached by means of traveling pulleys, yieldingly held, to power means for letting out and taking in said cable, and grappling means on the outer end of said cable, at the outer end of said arm, for catching a load moving through the air.

6. In combination, a superstructure, a horizontal arm mounted to swing horizontally about said superstructure, grappling means at the outer end of said arm, means yieldingly and extensibly holding said grappling means, a hook adapted to be pivotally connected with an aircraft load moving under said grappling means, whereby said hook catches in said grappling means to swing said load from a straight course to a circular course around said superstructure, said hook being extensible longitudinally and yieldingly, and means for yieldingly holding said hook in raised and operative position when approaching said grappling means.

7. In apparatus for landing aircraft load, a superstructure, a horizontal arm mounted at an elevation to swing about a vertical axis, grappling mechanism at the outer end of said arm, said grappling mechanism being yieldingly and extensibly secured to and along said arm, power means for said grappling mechanism, a hook member having a latch at the hook for catching and holding on to said grappling mechanism and telescoping members forming a part of said hook member and having spring means therein whereby to make said hook member extensible in a yielding manner, and means pivotally and yieldingly securing said hook member at its lower end to the load.

Signed at Los Angeles, Los Angeles County, California, this 12th day of September, 1927.

ELDRED F. TUCKER.